US007240805B2

(12) United States Patent
Chirnomas

(10) Patent No.: US 7,240,805 B2
(45) Date of Patent: *Jul. 10, 2007

(54) QUICK RELEASE FOR ARTICLE HANDLING MECHANISM

(76) Inventor: Munroe Chirnomas, 47 Skyline Dr., Morris Township, NJ (US) 07960

(*) Notice: Subject to any disclaimer, the term of this patent is extended or adjusted under 35 U.S.C. 154(b) by 0 days.

This patent is subject to a terminal disclaimer.

(21) Appl. No.: 11/224,504

(22) Filed: Sep. 12, 2005

(65) Prior Publication Data

US 2006/0011646 A1 Jan. 19, 2006

Related U.S. Application Data

(63) Continuation of application No. 10/875,485, filed on Jun. 24, 2004, now Pat. No. 6,942,122, which is a continuation of application No. 10/296,528, filed as application No. PCT/US01/16916 on May 23, 2001, now Pat. No. 6,786,355.

(51) Int. Cl.

| | |
|---|---|
| ***B23Q 7/04*** | (2006.01) |
| ***B65G 59/04*** | (2006.01) |
| ***B65G 59/02*** | (2006.01) |
| ***B65H 3/08*** | (2006.01) |
| ***G07F 11/10*** | (2006.01) |

(52) U.S. Cl. .......................... 221/211; 221/9; 221/278; 211/123; 414/797

(58) Field of Classification Search ................ 221/211, 221/278, 268, 9, 2, 13, 191, 129, 92, 123, 221/155, 197; 211/123, 210, 13; 414/797, 414/796.9

See application file for complete search history.

(56) References Cited

U.S. PATENT DOCUMENTS

| | | | | |
|---|---|---|---|---|
| 3,765,566 | A * | 10/1973 | Dasher | 221/129 |
| 5,240,139 | A * | 8/1993 | Chirnomas | 221/2 |
| 5,322,187 | A * | 6/1994 | Zizola | 221/150 R |
| 5,330,314 | A * | 7/1994 | Bennison | 414/627 |
| 5,562,232 | A * | 10/1996 | Pearson | 221/7 |
| 5,816,635 | A * | 10/1998 | Jansson | 294/64.1 |
| 5,984,623 | A * | 11/1999 | Smith et al. | 414/797 |
| 6,547,096 | B1 * | 4/2003 | Chirnomas | 221/123 |
| 6,786,355 | B2 * | 9/2004 | Chirnomas | 221/9 |
| 6,802,433 | B2 * | 10/2004 | Leykin et al. | 221/30 |
| 6,840,399 | B2 * | 1/2005 | Chirnomas | 221/7 |
| 6,868,983 | B2 * | 3/2005 | Chirnomas | 221/13 |
| 6,929,149 | B2 * | 8/2005 | Selfridge et al. | 221/150 R |
| 6,942,122 | B2 * | 9/2005 | Chirnomas | 221/211 |
| 6,968,974 | B2 * | 11/2005 | Chirnomas | 221/9 |

* cited by examiner

*Primary Examiner*—Gene O. Crawford
*Assistant Examiner*—Rakesh Kumar
(74) *Attorney, Agent, or Firm*—Lawrence C. Edelman

(57) ABSTRACT

An article dispensing apparatus, such as a vending machine (10), includes a controllably positioned suction hose dispenser (220) for retrieving articles (223) from a storage area (215). In one embodiment, a quick release device (500) coupled to the suction hose dispenser (220), is activated in response to mechanical contact caused by the controllable positioning of the suction hose dispenser (220), said activation facilitating a quick release of the retrieved article to a place (210) associated with an article dispensing area (22).

25 Claims, 7 Drawing Sheets

QUICK RELEASE FOR ARTICLE HANDLING MECHANISM

CROSS-REFERENCE TO RELATED APPLICATIONS

This application is a continuation application of and claims priority under 35 USC 120 of U.S. application Ser. No. 10/875,485, filed Jun. 24, 2004, now U.S. Pat. No. 6,942,122 issued Sep. 13, 2005, which itself is a continuation of and claims priority under 35 USC 120 of U.S. application Ser. No. 10/296,528, filed Nov. 23, 2002, now U.S. Pat. No. 6,786,355, which is a U.S. national phase designation of PCT application PCT/US01/16,916 filed May 23, 2001, the contents of which applications and patents are expressly incorporated herein by this reference thereto.

BACKGROUND OF THE INVENTION

1. Field of the Invention

The present invention relates generally to improvements in the design and operation of article handling apparatus and is particularly useful in the environment of article handling devices that use a suction-type article handling mechanism.

2. Description of the Prior Art

Most prior art article handling mechanisms, more specifically referred to in the description of the present invention as being in the environment of a point-of-sale (POS) article dispenser, rely on a multitude of motors, switches and solenoids for moving various portions of the handling mechanism, and handling of the articles themselves, such as packaged products. Most such machines require one motor, switch and/or solenoid dedicated for each row, column or type of article or package to be handled or dispensed therefrom. Such machines generally suffer from numerous disadvantages, such as poor reliability due to mechanical failures, as well known by those skilled in this art.

U.S. Pat. No. 5,240,139 represents a significant improvement in article handling devices. It describes the use of a negative air pressure lifter (i.e., article pickup or handling mechanism), which uses suction, i.e., a reduced or so-called "negative" air pressure created by a partial vacuum, for making a secure contact to an article to be retrieved by entering the open top of an article storage bin located in a refrigerated storage area of a vending machine. Although robotic, and specifically suction-type lifting mechanisms are in common use in factory settings, where space limitations are generally relaxed, their use in tight confines, such as an article vending machine, has not gained wide acceptance. Due to the greater reliability and versatility of vending machines of the type which utilizes suction technology for grasping and moving selected articles, it would be desirable to develop new techniques and methods for the operation and control of such machines, as well as for other more generalized article handling mechanisms.

Article contact detection is provided in the forenoted U.S. Pat. No. 5,240,139 by a mechanical or electromechanical proximity switch mounted at the article pickup end of the negative air pressure lifter.

It would be desirable to avoid the use of a proximity switch type of sensor at the article pickup end of the lifter, most notably because of the necessity of providing to the pickup head power and signal carrying conductors associated with the switch. Such conductors not only present obstacles to the freedom of movement of the pickup head, but also present reliability problems due to their potential for breakage. However, even if a "remotely-positioned" type of product contact sensor is provided, care must be taken to ensure that it is simple and reliable.

Furthermore, a vacuum breaker would also be desirable in a vending machine having a suction-type article handler, in order to facilitate a "quick release" of the product at the end of the dispensing cycle. U.S. Pat. No. 5,957,326 entitled APPARATUS FOR RETRIEVING RANDOMLY ORGANIZED ARTICLES, describes a vending apparatus having a suction-type article handler and a vacuum breaker. A pickup head having a plurality of suction cups mounted thereon (in order to help ensure the retrieval of one of a plurality of randomly organized articles for a storage bin) is lowered into the storage bin as suction is applied to the cups. After the passage of a predetermined amount of time, the machine controller causes the pickup head to start being removed from the bin. While the pickup head is being removed, a vacuum sensing assembly coupled to each suction cup determines if more than one of the suction cups has an article attached thereto (i.e., article contact is assumed in response to the sensing of vacuum in the hose coupled to a given suction cup). If more than one suction cup has an article adhered thereto, the machine controller causes a valve assembly 81 to release vacuum from all of the suction cups except one. Furthermore, when the product pickup head reaches a certain predetermined "delivery" position, the valve assembly 81 causes the vacuum to be released so that the product can be dropped. No mechanical connection is shown between the product pickup head and the valve assembly 81, so it is logical to assume that the valve 81 is activated by and electronic signal.

PCT patent publication WO 99/12132 entitled VENDING MACHINE discloses a vending machine having an articulated arm for positioning an article gripping suction hose into a freezer for retrieving articles to be dispensed. It teaches the use of both an electromechanically operated proximity switch at the article gripper head for turning the vacuum source on when the gripper makes contact with the product, as well as the use of a position sensor for advising the machine controller to energize a vacuum breaker when the gripperhead reaches a predetermined position indicative of the product reaching the dispensing area.

OBJECTS OF THE INVENTION

Accordingly, one of the objects of the present invention is to provide new techniques and methods for the design, operation and control of article handling mechanisms.

It is a further object of the present invention to provide new techniques and methods for the design, operation and control of article handling mechanisms of the type that utilize computer-controlled electromechanical technology, and in the illustrated embodiment a robotically positioned suction-type gripper, for grasping and moving a selected article from one area to another, such as from a storage area to a dispensing area.

It is also an object of the present invention to provide new techniques and methods for such mechanisms, which improve the speed and accuracy of the article handling operation while still handling the articles to be dispensed in a careful manner so as to prevent any damage thereto.

SUMMARY OF THE INVENTION

The above objects are achieved in an illustrated embodiment of an article dispensing apparatus embodied, for example, as a vending machine, including a controllably positioned suction hose dispenser for retrieving articles from a storage area. In one embodiment, a sensor having an output responsive to changes in partial pressure inside the air hose, such as an airflow sensor coupled to the suction-hose, can initially act to sense the timing of contact of the suction hose with an article to be dispensed. As long as suction is provided to the gripping end of the suction hose prior to the hose contacting the article to be retrieved, the airflow (and partial pressure) inside the hose will change dramatically as the gripping end of the suction hose makes contact with the article. Furthermore, at the moment when the gripping end of the suction hose is no longer in substantial contact with the article, the airflow sensor again provides an indication signal, due to the sudden change in airflow (and partial pressure) that occurs at that time within the hose. The signals generated by the airflow sensor can be used in place of the prior art mechanically operated proximity sensor, to stop the approach of the gripping end of the hose towards the article, and serve as an indication to initiate removal of the article from the storage area.

When the control mechanism of the dispenser has determined normal operation, the time of the occurrence of the airflow signal can be used by the control mechanism to confirm that the article has been properly moved, for example from the storage area to a dispensing area, but if the sensed airflow signal has been determined by the control mechanism to be premature (because the signal from the airflow sensor occurred before the hose positioner moved the hose to a predetermined dispensing position), it's occurrence indicates a faulty or failed dispensing/vend operation. Accordingly, the control mechanism can then take appropriate action, such as to re-attempt the dispensing operation.

When the airflow signal indicates proper operation, the control mechanism can also use the airflow signal for checking, and recalibrating if necessary, it's control of the hose positioner In an embodiment illustrated herein, the airflow sensor is used in combination with an airflow control mechanism, i.e., a vacuum or suction release (i.e., breaker), to facilitate a "quick-release" of the article being handled. In this regard, the airflow sensor can be included in its own housing, or as in the illustrated embodiment, a housing which also includes therein the vacuum release/breaker mechanism. Furthermore, in a preferred embodiment, a mechanical linkage can be used to activate the vacuum release/breaker mechanism in response to direct mechanical contact by the article handling mechanism, and thereby reliably trigger a rapid equalization of air pressure inside the housing towards ambient when it is time for the article handling mechanism to release the selected article. Even furthermore, since contact of the article handling mechanism with the mechanical or electromechanical linkage occurs at a known position, the known position can signify a "virtual home" and therefore reaching this "virtual home" position can be used by the control mechanism, as noted above, to check the accuracy of it's positioning control of the article handling mechanism, and if necessary, its recalibration. In a further embodiment, position sensing for the article handling mechanism and activation of the vacuum release/breaker mechanism could be carried out using equivalent electromechanical or all electronic devices, such as a magnetically operated position switch, or a solenoid, respectively.

Although use of an airflow sensor is described in the preferred embodiment, it is intended that a vacuum sensor coupled to the hose so to sense changes in the partial pressure inside the hose, is a further embodiment in place of, or even in addition to, the described airflow sensor. However, some of the advantages of an airflow sensor in the present embodiment are that it has more tolerance and is more accepting of power and vacuum fluctuations. Rather than determining vacuum at a preset level, which may require a more delicate measuring apparatus, the airflow sensor more easily determines changes in relatively small amounts of airflow in the hose.

DETAILED DESCRIPTION OF PREFERRED EMBODIMENTS OF THE INVENTION

Figure 1:
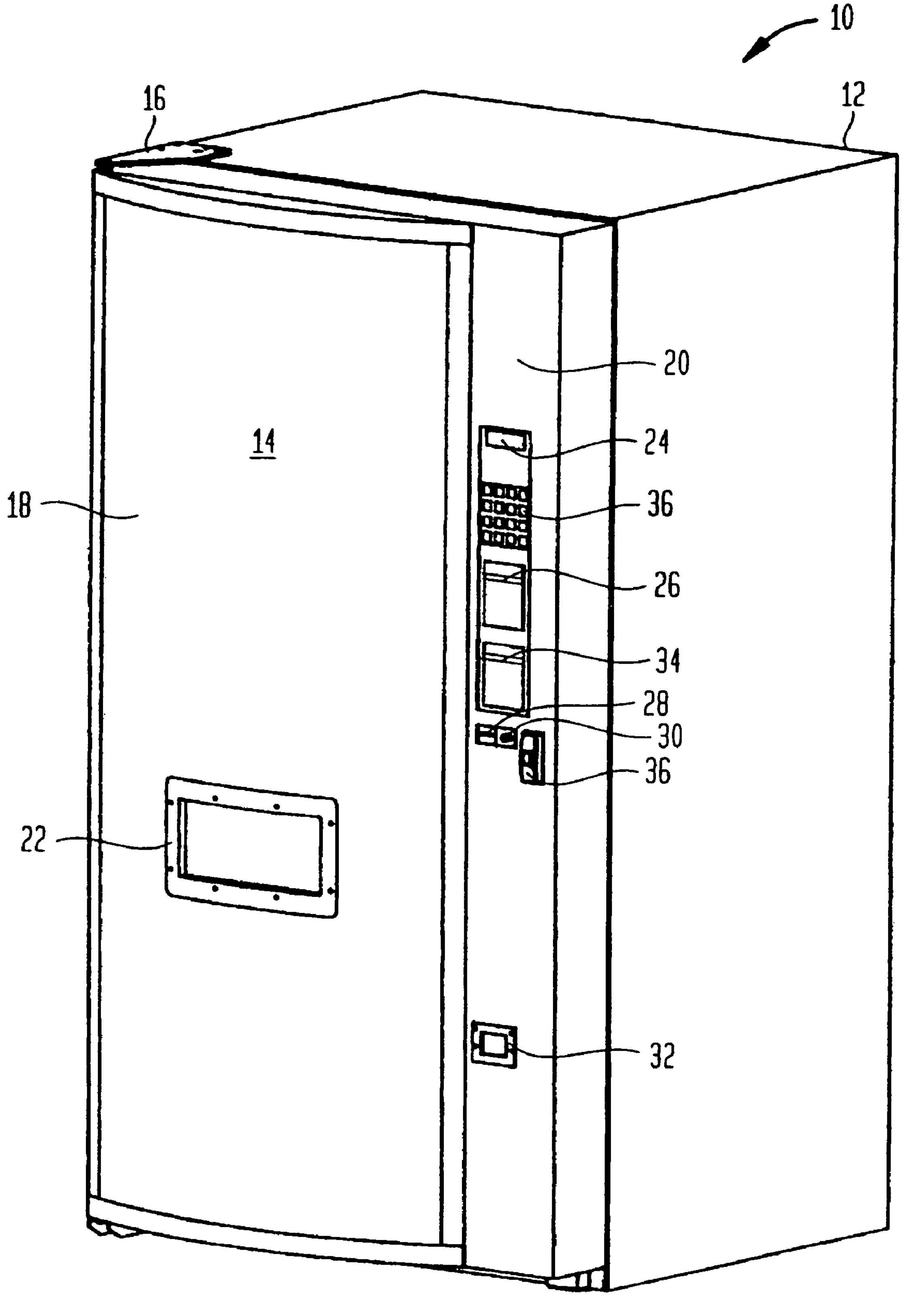
FIG. 1 is a front perspective view of a vending machine constructed and operating in accordance with the principles of the invention.

FIG. 1 illustrates an environment for the invention described herein, in the form of an article dispenser, such as a point-of-sale (POS) dispenser. Although throughout the following description, reference is made to implementation of the invention in a vending machine environment, it is intended that the term "vending machine", and in fact the environment for the present invention, include more general purpose article handling, retrieval and/or dispensing apparatus, as well as POS equipment. Such equipment, if embodied as a portable device may comprise and be about the size of a traditional vending machine or as large as a tractor-pulled trailer, and if embodied as a non-portable device may comprise and be embodied as an automated dispensing room or an area located in a permanent structure, such as in a building (aboveground or underground, and with or without interior walls or an enclosing cabinet). Furthermore, it is intended that the term "articles" or "products" include in at least some of the embodiments of the invention described herein, not only goods, but also services and/or information, in either a permanent or temporal form.

Accordingly, FIG. 1 illustrates a perspective view of a vending machine 10, comprising one embodiment for an apparatus which is constructed and operates according to the present invention. Vending machine 10 includes a main cabinet 12 and a front door 14 mounted on a hinge 16 for providing access to the interior of the vending machine for servicing (refilling it with articles, maintenance, etc.). Note, in a further vending machine embodiment, a service door or port could be positioned anywhere on or as a part of cabinet 12. In FIG. 1, front door 14 is shown in a closed position, forming an enclosure with main cabinet 12, within which various components of vending machine 10 are housed, as explained in more detail below.

Front door 14 includes a convex-shaped section 18 adjacent a flat section 20; however, these particular shapes are not necessary to the invention. The convex-shaped section 18 comprises a translucent plastic display panel 18, which typically has brand name and/or logo graphics displayed thereon, and may even include graphics which illustrate the individual articles that are vendible by vending machine 10, as well as the price and/or selection information for the articles. Panel 18 is typically back-light using fluorescent bulbs, not shown.

A customer retrieval area 22 is formed in the panel 18 on door 14 so that articles stored therein can be discharged to a user of vending machine 10.

Various user interface components are mounted on flat section 20 of door 14. A customer display 24 may be a conventional fluorescent or LED display panel for displaying various items of information to a user of machine 10, such as feedback to the user of the selection made, the amount tended, and if the product is sold out or being vended. For accepting payments, a bill acceptor slot 26 accepts paper money into a conventional bill acceptor mechanism (mounted inside machine 10 so as to have its user interface portion extend through an aligned opening in flat section 20) for purchasing articles or for making change. A coin insertion slot 28 accepts coins into a conventional coin changer (also mounted inside machine 10 so as to have its user interface portion extend through an aligned opening in flat section 20) for purchasing articles or for making change. A coin return actuator 30 comprises a conventional push-button mechanism for activating a coin return portion of the coin changer mechanism which, upon actuation returns coins inserted by the current user, to a coin return well 32. The coin return portion of the coin changer mechanism also provides change to the coin return well 32 either in response to the purchasing of articles or for making change for paper money or larger coins. A credit/debit card slot 34 accepts a plastic credit/debit card inserted into a conventional card reader mechanism (also mounted inside machine 10 so as to have its user interface portion extend through an aligned opening in flat section 20) for allowing a user to pay for purchases via credit/debit cards. A door lock mechanism 36 enables front door 14 to be secured so that it cannot be opened without a key. For allowing user selections, display panel 18 may include graphics, as noted above, which indicates the various articles vendible by the machine, as well as their associated price and unique selection number. Alternatively, flat section 20 could include a group of graphic article displays and their associated price. A conventional keypad push-button mechanism 38 is provided for enabling a user to select a desired article from vending machine 10. Alternatively, push-button mechanism 40 could include individual push buttons for each article selection, as well as an associated price display; and even furthermore, a user operated touch screen could replace pushbutton mechanism 40 and display 24. Although not shown in FIG. 1, machine 10 also includes a conventional telecommunications component that can be used for authenticating credit card purchases, as well as other uses relating to machine control and reporting the inventory and operational status of machine 10 to a remote location, as more fully described later on. Although vending machine 10 is illustrated to include the above described user interface components, in a more minimal embodiment of the invention, most, if not all, of these user interface components could be omitted, and the dispenser could in fact be controlled from a remote location, with or without a local payment system.

Figure 2:
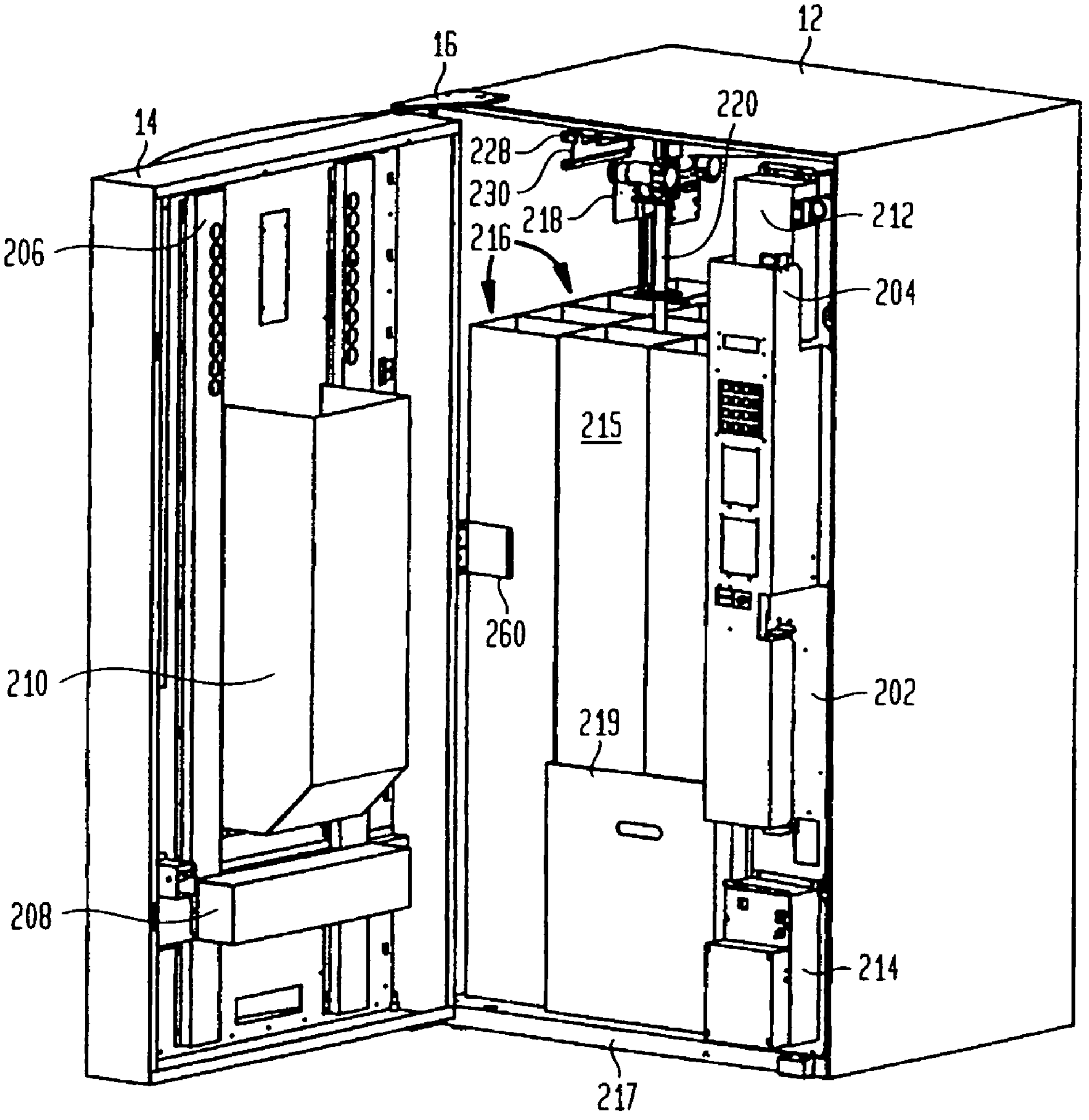
FIGS. 2 and 3 are front perspective views of the vending machine of FIG. 1, with the front door opened, so as to illustrate the main mechanical and electrical components therein.
Figure 3:
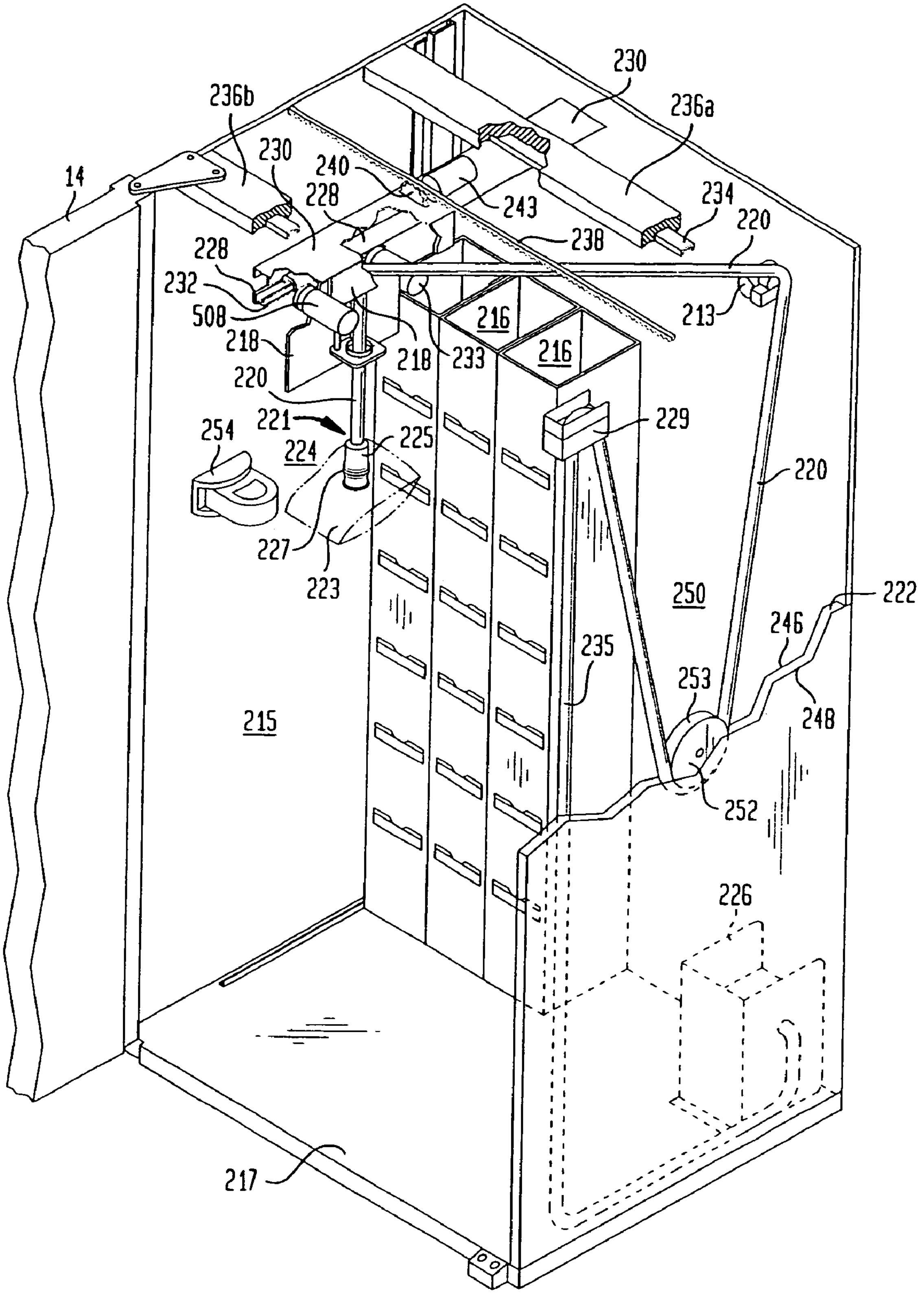

FIG. 2 is front perspective view of the vending machine of FIG. 1, with the front door open, so as to illustrate the main mechanical and electrical components therein. FIG. 3 is a somewhat idealized version of the main components of the article handling mechanism portion of vending machine 10, and is useful for understanding its general operation. Note, some portions of vending machine 10 are shown in these FIGURES cut away in order to better illustrate the interior components.

Referring first to FIG. 2, it is noted that the right portion of the front of cabinet 12 includes a vertically mounted support panel 202 which is used for mounting most of the user interface components. More specifically, a hinged mounting bracket 204 is mounted on panel 202 and aligned with an opening in door 14 so that the user interface components, such as the selection button keypad 40, coin insertion slot 30, bill acceptor slot 28, coin return 32, and customer display 24, are all accessible to the user from the front side of door 14. For backlighting panel 18, two fluorescent bulb light sources (other numbers of light sources can be used), are mounted on the interior of front door 14 behind protective covers 206. Also mounted on the interior of front door 14 is a ballast 208 for the fluorescent bulbs, and a product delivery chute 210. Note that product delivery chute 210 is unconventional in that it is extremely tall, and therefore serves as a security measure to prevent unauthorized access into the machine by insertion of an arm or other grasping mechanism into the customer retrieval area 22 from outside the machine. In typical prior art vending machines, a swinging security door is usually found at the top of chute 210, which swings into in a vandal blocking position when the customer pushes in the swinging door at the entrance to the product retrieval area 8. In a further embodiment of vending machine 10, such a security door could be used in conjunction with product delivery chute 210, especially if chute 210 is not as tall as the one illustrated in FIG. 2 and also if the product retrieval area 8 is located higher up on machine 10. Mounted behind hinged mounting bracket 204 is a conventional bill acceptor mechanism for causing paper money inserted into bill acceptor slot 28 to be drawn into vending machine 10, a conventional coin changer for supplying coins to coin return slot 34, and a conventional bill validator for ascertaining proper insertion of paper money into bill acceptor slot 28.

A control board 212 comprises a printed circuit board on which circuitry is formed and to which integrated circuit chips are attached. Control board 212 includes a microprocessor that is electrically connected to various sensors, motors, the above described user interface elements, as well as other devices within vending machine 10, to control the operation of vending machine 10 as described herein. When reference is made in this description to performance of specified functions by control board 212, it is to be understood that these functions are controlled by the microprocessor and the associated circuitry formed on control board 212. A power supply 214 is mounted on panel 202 and supplies power for the electrical components of vending machine 10.

Referring now also to FIG. 3, it is apparent that the bulk of the interior of cabinet 12 is available as an article storage area 215. In the illustrated embodiment, a plurality of vertically aligned article storage bins 216 are arranged on the interior floor 217 of cabinet 12, for storing articles 223 to be vended by machine 10. In a refrigerated environment for the present invention the bins could be arranged to sit on a shelf positioned above the refrigeration system.

An opened-top container 219 can be dimensioned to hold a plurality of article storage bins 216 therein, and used, for example to facilitate the simultaneous handling (i.e., removal, installation and transportation) of the plurality of bins 216 into/out of the article storage area 215. Container 219 also facilitates rapid and accurate positioning of a plurality of the article storage bins into the storage area of the article handling apparatus. A carriage 218 (which may be more generally referred to as an X-Y or planar positioning mechanism) is coupled to the interior topside of cabinet 12 and adapted for being controllably positioned by the control board portion 212 of machine 10, to a location centered over (so as to be aligned with) the open top-end of a selected one of article storage bins 216.

Although vertical alignment of the article storage bins 216 is shown, non-vertical, i.e., slanted or even horizontal alignment is also be possible. Furthermore, although article storage bins 216 are shown to be in an ambient environment, bins 216 could in fact the positioned in a freezer which is located in the bottom of storage area 217, such as shown and described in the forenoted U.S. Pat. No. 5,240,139 or the entire storage area may be located in a refrigerated environment.

In the environment of the present invention, an air hose 220 is continuous from a point before it's exit from a hose storage area 222 over orthogonally positioned rollers 213 (or other low-friction arrangement), to its free end 221. Free end 221 includes a weighted portion 225 in combination with a bellows extension tip portion 227. Depending upon the physical characteristics of the articles to be dispensed, article pickup head 224 may comprise only the weighted portion 225, or this portion in combination with a fitting specifically adapted to the type of packages to be dispensed, such as the bellows tip 227 (serving as an active suction cup) or a compliant tip without a weight. Hose 220 has one end coupled to a source of negative air pressure, i.e., suction, which source of suction comprises in the preferred embodiment a blower motor 226, and a free end coupled to the article pickup head 224. In the present invention, the word continuous is intended to mean a hose which is connected and acts between it's end points, in order to accomplish the functions required by it, as a unitary/single hose, i.e., one than one hose can be coupled together to act as a single hose. An air hose portion 235 provides suction from blower motor 226 to one port of an air junction box 229, while continuous hose 220 is connected to a second port of air junction box 229.

Air junction box 229, in the illustrated embodiment included at a top portion of hose storage area 222, includes an airflow sensor and vacuum breaker assembly which is constructed and operates in accordance with the principles of the invention, described in greater detail later. The airflow sensor is used to develop a signal which is applied to the controller of the vending machine and is representative of the airflow through air hose 220. The vacuum breaker assembly is used to quickly bring the air pressure in hose 220 to the ambient pressure, thereby facilitating a "quick-release" of an article transported by the article pickup head, into the dispensing chute 210. It is noted that a quick release of the products does not have to occur at the top of dispensing chute 210, and in the event that it is desirable to avoid subjecting the article to forces which result from jarring or dropping, the article pickup head could proceed to the bottom of the dispensing chute 210 before providing release of the article, with or without the use of the quick release valve. As will be described in greater detail with reference to FIGS. 5 and 6, in one embodiment, the airflow sensor arrangement may comprises a two-part switch, a first part includes a reed switch mounted on a top portion of box 229, and a second part includes a magnet mounted at the free end of a swinging arm mounted inside box 229. As the arm swings inside box 229 due to changes in airflow, the switch is "toggled", thereby indicating changes in airflow. The use of this airflow signal will also be described in greater detail later. In an alternative embodiment, the functions of the airflow valve and quick release could be built into the blower motor enclosure. With this arrangement, hose 220 would be continuous from the picker head all of the way to the blower motor.

As shown generally in FIG. 3, alignment of carriage 218 with a selected one of bins 216 is accomplished in the front/back (Y) direction using a front/back linear slide 228 (shown in a cut away view) mounted to an "L" shaped front/back beam 230 so that carriage 218 can be controllably positioned therealong using slide 228. A bottom edge portion of beam 230 includes a rack portion 232 and carriage 218 includes a reversible electric motor 233 that drives a gear (not shown) which engages rack portion 232. Application of forward and reverse motor control signals from control board 212 to motor 233 causes carriage 218 to be driven in the front/back directions. Alignment of carriage 218 in the left/right (X) direction is accomplished in a similar manner, using a left/right linear slide 234 which slidably couples the top side of front/back beam 230 to the underside of each of spaced apart left/right beams 236*a* and 236*b*. Beams 236*a* and 236*b* are rigidly attached to the inside top portion of cabinet 12. A rack 238, also rigidly attached to the top inside portion of cabinet 12 and in parallel with beams 236, is engaged by a gear 240 driven by a reversible motor 243 mounted near the inside corner of beam 230. Application of forward and reverse motor control signals from control board 212 to motor 243 causes a rotation of gear 240 and a corresponding movement of beam 230, and hence carriage 218, in the left/right (X) directions. In an alternative embodiment the positioning mechanism portion comprising beams 236*a* and 236*b* could be embodied as a support bracket having opposed flanged edges, and linear slides 234 could each comprise a bracket fixed to beam 230 and including a set of orthogonally positioned rollers for engaging the orthogonal sides of a respective one of flanged edges 239*a* or 239*b*.

Carriage 218 includes a roller arrangement (not specifically shown, but which may comprise three orthogonally positioned rollers at the point where hose 220 enters carriage 218) for redirecting the movement of hose 220 from a substantially horizontal direction along the top interior portion of machine 10 (i.e., in the X,Y direction), to a direction perpendicular thereto (i.e., in the Z direction). Thus, movement of carriage 218 will move the free end 221 of hose 220 so that it can be axially aligned with a selected one of bins 216. Thereafter, a hose drive mechanism (not specifically shown, but which may comprise a set of conventionally operated "pinch rollers"), is driven by a reversible motor 508 for driving pickup head 224 into/out of the selected bin 216 in order to retrieve articles stored therein. In the illustrated embodiment the hose drive mechanism is mounted in carriage 218, but in a further embodiment motor 241 and the pinch rollers, or some other drive mechanism, such as an articulated arm, could be mounted so as to act somewhere else along the length of hose 220.

This arrangement, where hose 220 travels in the same X,Y plane that carriage 218 travels, facilitates a compact hose positioning and drive mechanism embodiment for the present invention.

As previously noted, since hose 220 is formed of a continuous material from its connection to the source of suction at one end to the pickup head 224 at its other end, means are necessary for providing hose storage and/or retraction during travel of the pickup head 224 in the X, Y and Z directions, as appropriate during the article dispensing operations.

Accordingly, as shown in FIG. 3, placing an interior wall 246 parallel and adjacent to an exterior wall 248 of cabinet 12 is used to form the hose storage area 222 there between. Hose storage area 222 has a cross-sectional area which is slightly greater than the cross-sectional area of the hose loop formed therein. Walls 246 and 248 are shown partially cut-away so as to illustrate a gravity feed self-retracting loop tensioner/retraction mechanism 250 formed in hose 220. Loop tensioner 250 is constrained for movement within hose storage area 222, and made somewhat self-retracting by comprising a rolling weight 252 having a groove 253 along its periphery in order to provide constant centering of the weight within hose storage area 222 and for providing a constant "loop forming" tension on hose 220. Furthermore, centering of the grooved rolling weight 252 within hose storage area 222 results in centering of hose 220, thereby preventing hose 220 from rubbing with the walls of hose storage area 222 during X, Y and Z repositioning of pickup head 224. In order to prevent binding of hose 220, rolling weight 252 is dimensioned so as to be slightly larger than the diameter of hose 220 and the width dimension of hose storage area 222 is dimensioned to be only slightly larger than the width dimension of rolling weight 252. The specific amount of weight used for rolling weight 252 is a matter of design choice, and depends upon various factors, such as the weight of the articles to be moved, the strength of the motors used to drive the hose in the Z direction, etc. In a further embodiment, it may be desirable to couple weight 252 to a lower portion of cabinet 12 using a spring, for adding further tension to loop tensioner 250.

It is also noted that this gravity-based retraction/hose storage technique meets the storage requirements needed for both the X and Y movements of carriage 218 (left/right and front/back), as well as for the Z movement of pickup head 224. Of course this gravity-based retraction/hose storage technique would work equivalently well in an embodiment wherein the hose positioning mechanism used an R, θ, scissors, articulated arm, or other technique. Furthermore, the illustrated gravity-based retraction/hose storage technique is not necessary for the present invention, and in fact a fully or partially motorized retraction technique could also be used.

As shown in FIGS. 2 and 3, as an article 223 is moved by pickup head 224 along its way from a storage bin 216 to chute 210, it is positioned past an article identification (ID) device 254 mounted within cabinet 12. A specific type of article ID device is not required for the present invention, and depending upon system constraints, such a device may comprise, for example, a bar code scanner or other optical image/pattern recognition system, or even a non-optical system, such as a radio frequency identification (RFID), or magnetic-based system mounted within cabinet 12. for uniquely identifying and confirming that the article being dispensed is in fact the article that was selected. The construction operation of such article identification devices are well known to those of ordinary skill in this technology, and therefore further description in this regard is not necessary.

Article ID device 254 is mounted within cabinet 12 at a relatively fixed location, the mounting being such that some controlled movement in the orientation of article ID device 254 may be facilitated, in order to help ensure a good "view" of the article being transported, and a high confidence of the transported articles being identified. One way to provide such controlled movement for ID device 254 would be to mount it on a piezoelectric substrate, and control board 212 could provide a voltage to the substrate so as to shift the "view" of ID device 254. It is noted that by using an appropriately positioned article ID device 254, only a single article ID device 254 is needed. This is particularly useful for a robotic type dispenser, since the robotic apparatus can controllably position, and re-position if necessary, the article in the vicinity of the article ID device 254, thereby helping ensure a reliable ID of the article.

Alternative embodiments for the robotic mechanism described above are contemplated to be within the scope of the present invention. For example, the airflow sensor and vacuum breaker invention to be described later in the illustrated embodiments, could also be useful in dispensing apparatus using other types of robotic positioners, such as a rotary type device (R, θ), an articulated arm, telescoping or scissor system, etc.

Even furthermore, although only a single storage area 215, hose 220 and carriage 218 are shown in the illustrated embodiment, the invention described herein could also be used in a dispensing apparatus/article handler of the type having multiple storage areas and/or robotic article handling mechanisms, such as two robotic mechanisms (vertically or horizontally positioned) each one serving, for example, a different storage area (such as one being refrigerated and one being non-refrigerated, or one being oriented for vertical storage of products and the other one for horizontal). In this case a separate hose, hose positioning mechanism and hose storage area may be required, although they may possibly share a single source of suction (e.g., blower motor 226), airflow sensor and vacuum breaker. Alternatively, a single hose, hose positioning mechanism and hose storage area could be used in a further embodiment where the single hose services more than one article storage area. Each robotic article handling mechanism could have its own article ID device, or they could share a single article ID device.

In the embodiment illustrated herein, blower motor 226 provides a relatively high volume of airflow but a relatively modest negative air pressure. As a matter of design choice, blower motor 226 could comprise a vacuum pump, so as to provide a much more substantial degree of negative air pressure, but, due to size and cost limitations, a correspondingly reduced amount of airflow. In this latter case, the diameter of the air hose 220 would be reduced from the diameter illustrated in FIGS. 2 and 3, which may be particularly important in some applications of the present invention. The illustrated embodiment is particularly useful for picking up flexible packages since a momentary or even sustained leak in the coupling to the packaging to the article will generally not result in dropping of the package, while at the same time offering extreme versatility due to the ability to pick up a wide variety of shaped objects of varying weight and size. In the event that blower motor 226 comprises a vacuum pump, it could be used alone or in combination with a storage tank coupled to the suction hose via a valve and air hose, in order to provide a greater volume of airflow. Alternatively a compressor could be used in combination with a venturi device to create a vacuum.

Figure 4:
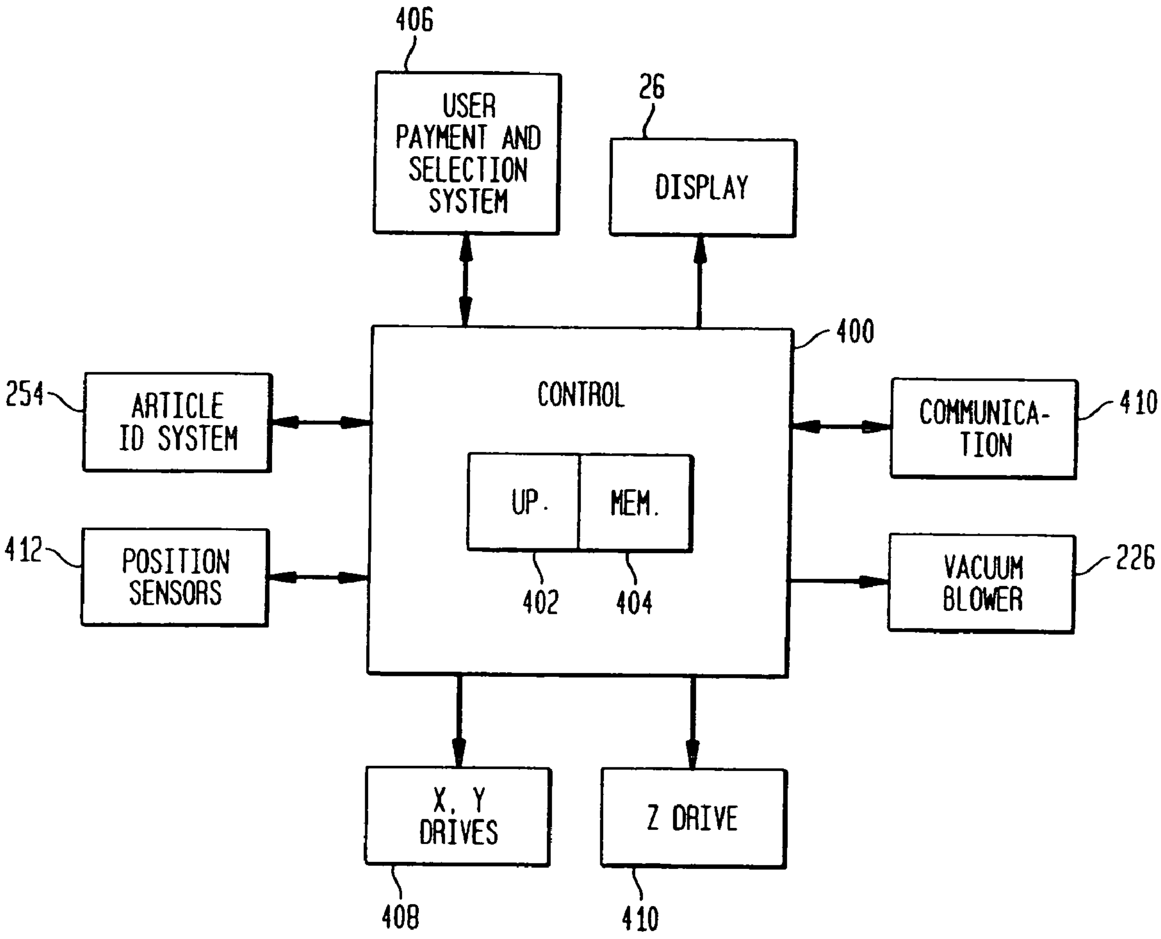
FIG. 4 is a functional block diagram illustrating the cooperation of the main mechanical and electrical components in the vending machine of FIG. 1.

FIG. 4 illustrates a functional block diagram of the general operation of the various aspects of the invention described herein, as embodied in an article dispenser of the type comprising, for example, vending machine 10. A control system 400 including a microprocessor 402 and associated memory circuits 404, is constructed on control board 212. Control system 400 may also include the electronic parts of other portions of vending machine 10, as appropriate. Memory circuits 404 include ROM for storage of operating programs (embedded software, as well known, for accomplishing the described herein control of vending machine 10), as well as RAM cache for temporary storage of operational data during system operation as well as other data as may be needed. Control system 400 is responsive to user operation of the user payment and selection system 406 (including the coin and bill mechanism 28 and 30 and the selection buttons 40 of FIG. 1) for operating the user interface and article handling apparatus of vending machine 10 so as to dispense the article desired by a user. More specifically, upon proper payment for a selection made by the user using payment and selection system 406, control system 400 operates the X/Y (left/right and front/back) drive motors 408 so as to position pickup head 224 to be in alignment with a bin 216 which holds the article selected by the user. Control system 400 then engages a hose drive motor 410 (Z-motor) mounted within and carried by carriage 218, so that hose 220 is driven in a direction towards the top article in the aligned bin. At an appropriate time before head 224 contacts the article to be removed (and in an embodiment of the invention where cabinet 12 does not include refrigerated air, an appropriate time may be just before head 224 enters bin 216, but if the air is refrigerated, just before contact with the desired article is expected, in order to minimize removal of refrigerated air), control system 400 activates blower motor 226 so as to provide lifting suction at pickup head 224. Upon position sensors 412 determining that pickup head 224 has contacted and become secured to the desired article, control system 400 causes hose drive motor 410 to reverse its direction so as to retract hose 220 from the aligned bin 216 and thereby lift out from the bin 216 the selected article. Carriage 218 is then driven to a position in alignment with the article delivery chute 210. As the desired article 223 is moved along its way from a storage bin 216 to chute 210, it is positioned past the article ID device 254 for uniquely identifying and confirming that the article being dispensed is in fact the article that was selected. Upon sensors 412 sensing alignment of carriage 218 with chute 210 (in this case sensor 202 may comprise a reed switch mounted on a front wall of the cabinet, and a magnet mounted at a leading edge of carriage 218), control system 400 turns off vacuum blower 226 and the resulting loss of vacuum causes the selected article to drop into the customer retrieval area 22. It is noted that position sensor 412 may include the airflow sensor of the present invention, to be described next, which is positioned in air junction box 229, or in a further embodiment, a mechanically operated plunger-type position sensor associated with pickup head 224. Even furthermore, position sensors 412 may also include a reed switch mounted on a front wall of the cabinet, and a magnet mounted at a leading edge of carriage 218.

As noted above, accurate control of energization of blower motor 226 is particularly advantageous in the event that the inside of the cabinet is refrigerated, since accurate control would decrease the amount of refrigerated air being displaced by blower motor 226. In the preferred embodiment, the microprocessor 402 will energize blower motor 226 as the pickup head 224 approaches the desired article, and in fact only when it is in the immediate proximity of the desired article (and not earlier), due to control system 400 maintaining updated information about the height of the stack of articles in each bin 216. The height is assumed to be at a predefined level upon refilling of the vending machine 10 with articles by the operator of the vending machine. Control system 400 may confirm the assumed height by moving at a reduced speed towards a given article on the first retrieval attempt after the storage area has been refilled and then compare the assumed height to the actual height. Subsequently, control system 400 may cause approach of articles in that storage area to be at a higher speed, and only slow down when in the immediate proximity of the "top" article in that bin. This technique helps ensure that the stored articles will not be damaged.

It is noted that in an alternate embodiment, the height of each article may not be needed. A simpler way of controlling operation of blower motor 226 without knowing the specific height of the stack of articles, would be to turn on the blower motor 226 just prior to the learned stack height of the prior vend. The specific height of the articles stored in that stack can be pre-programmed into the memory of control system 400, or can be learned by the control system by comparison of prior vend heights in each bin, and used to calculate the stack height for the next article to be vended.

When a "reset" switch (not shown) is activated by the machine operator, control system 400 automatically defaults to using the above height detection technique since it can be assumed that the operator may have changed the product load levels and consequently the product heights in each bin.

For the embodiments described herein, it is assumed that energization of the blower motor or other suction creating device, is meant to be equivalent to the appearance of a prompt package securing force, i.e., suction, at the pickup head 224.

A communication system 414 is connected to control system 400 so as to provide article inventory and vending machine operation information to a remote location, as well as to allow for control of the operation of the vending machine from a remote location. In this regard, communication system 414 may include a connection to means for making a wire-line and/or wireless transceiver interface through which a communication link with a remote computer can be established. Additionally, the communication system 414 may communicate with a plurality of other similarly connected vending machines in the same general area and communicate therewith using the wire-line interface or wireless communication. Even furthermore, communication system 414 can provide for communication with multiple vending machines and/or a local server/controller, in a local site along a LAN (local area network), LAWN (a local area wireless network) or a WAN (wide area network). The remote computer may comprise a database which receives and/or accumulates the operational data from one or more vending machines, which data is then accessible (via, e.g., the Internet, using a wired or wireless connection) using appropriate encryption, to others, such as route drivers, machine operators, machine owners, product suppliers, etc. Furthermore, the remote site may give feedback to the vending machines, such as authorization information, which can control its operation, such as allow its continued operation.

In the embodiment illustrated herein, blower motor 226 provides a relatively high volume of airflow but a relatively modest negative air pressure. As a matter of design choice, blower motor 226 could provide a much more substantial degree of negative air pressure, but, due to size and cost limitations, a correspondingly reduced amount of airflow. In this latter case, the diameter of the air hose 220 would be reduced from the diameter illustrated in FIGS. 2 and 3, which may be particularly important in some applications of the present invention. The illustrated embodiment is particularly useful for picking up flexible packages since a momentary or even sustained leak in the coupling to the packaging to the article will generally not result in dropping of the package, while at the same time offering extreme versatility due to the ability to pick up a wide variety of shaped objects of varying weight and size. An alternative arrangement of blower motor 226 could be provided by a vacuum pump, alone or in combination with a storage tank coupled to the suction hose via a valve and air hose. Alternatively a compressor could be used in combination with a venturi device to create a vacuum. To get operational performance with a vacuum pump that is similar to that of a conventional blower motor 226 would require a storage tank and/or vacuum pump of substantially larger size.

Figure 5:
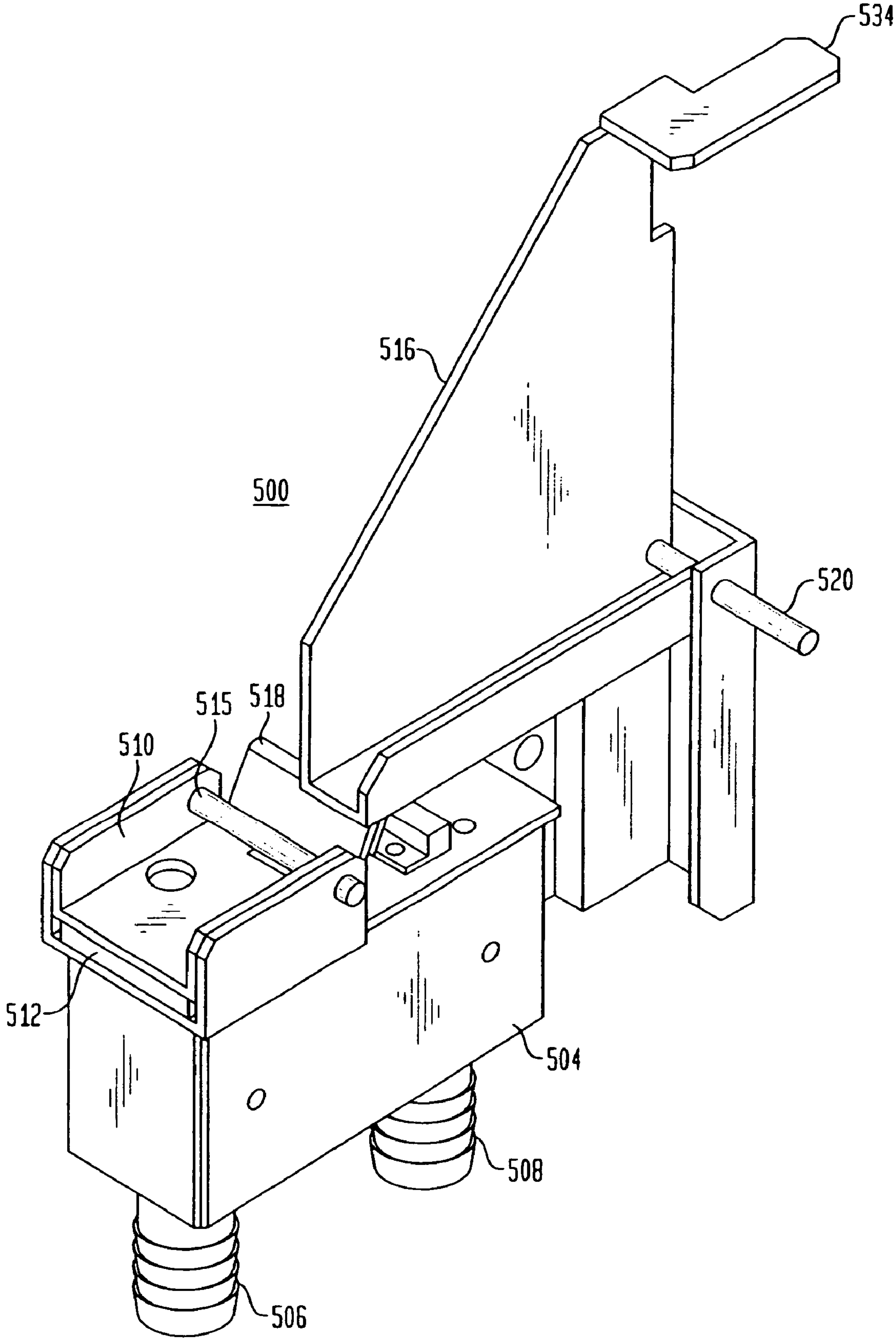
FIGS. 5, 6 and 7 illustrate details of a vacuum junction box and a door mounted operating linkage mechanism therefore, which is constructed and operates in accordance with principles of the present invention.
Figure 6:
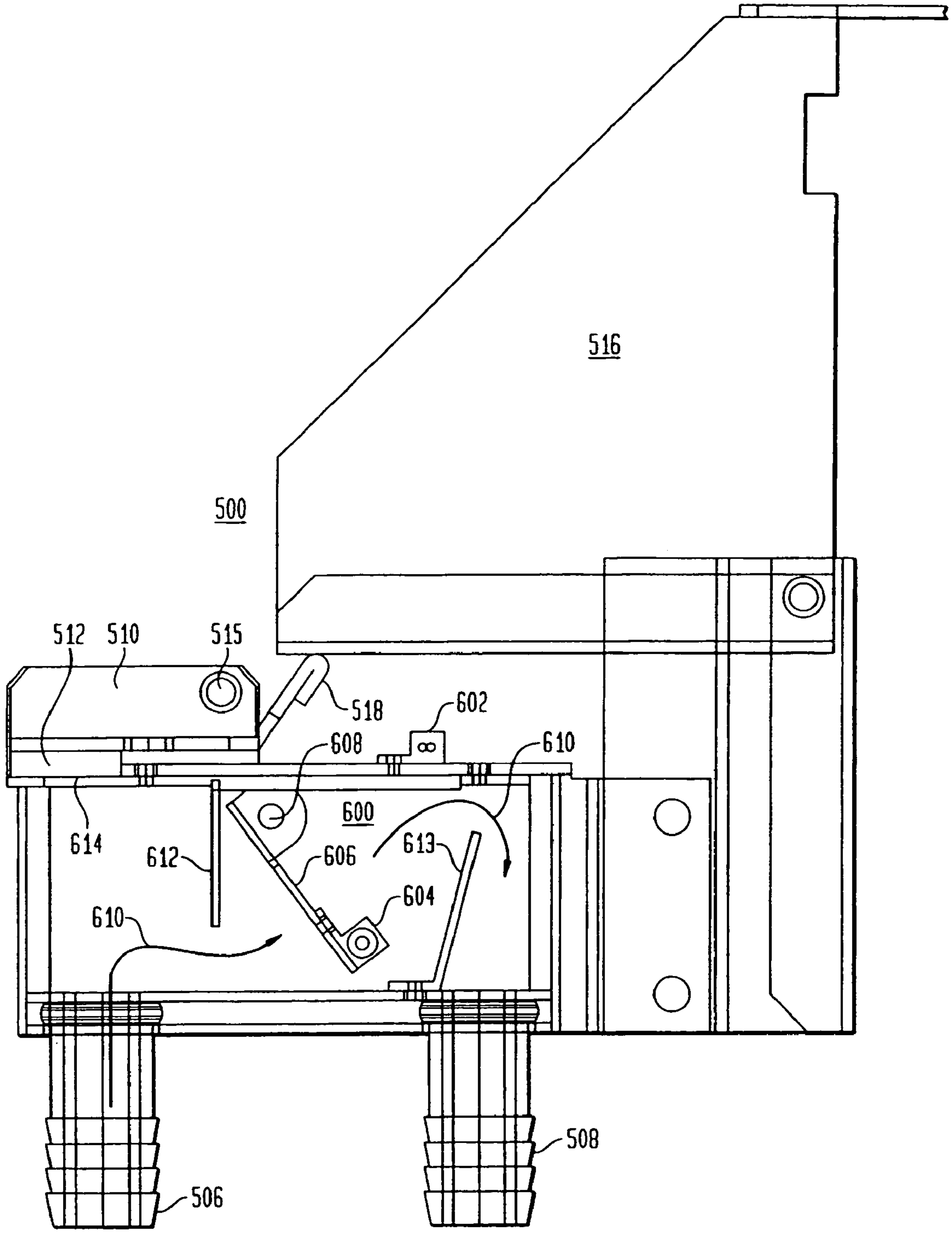
Figure 7:
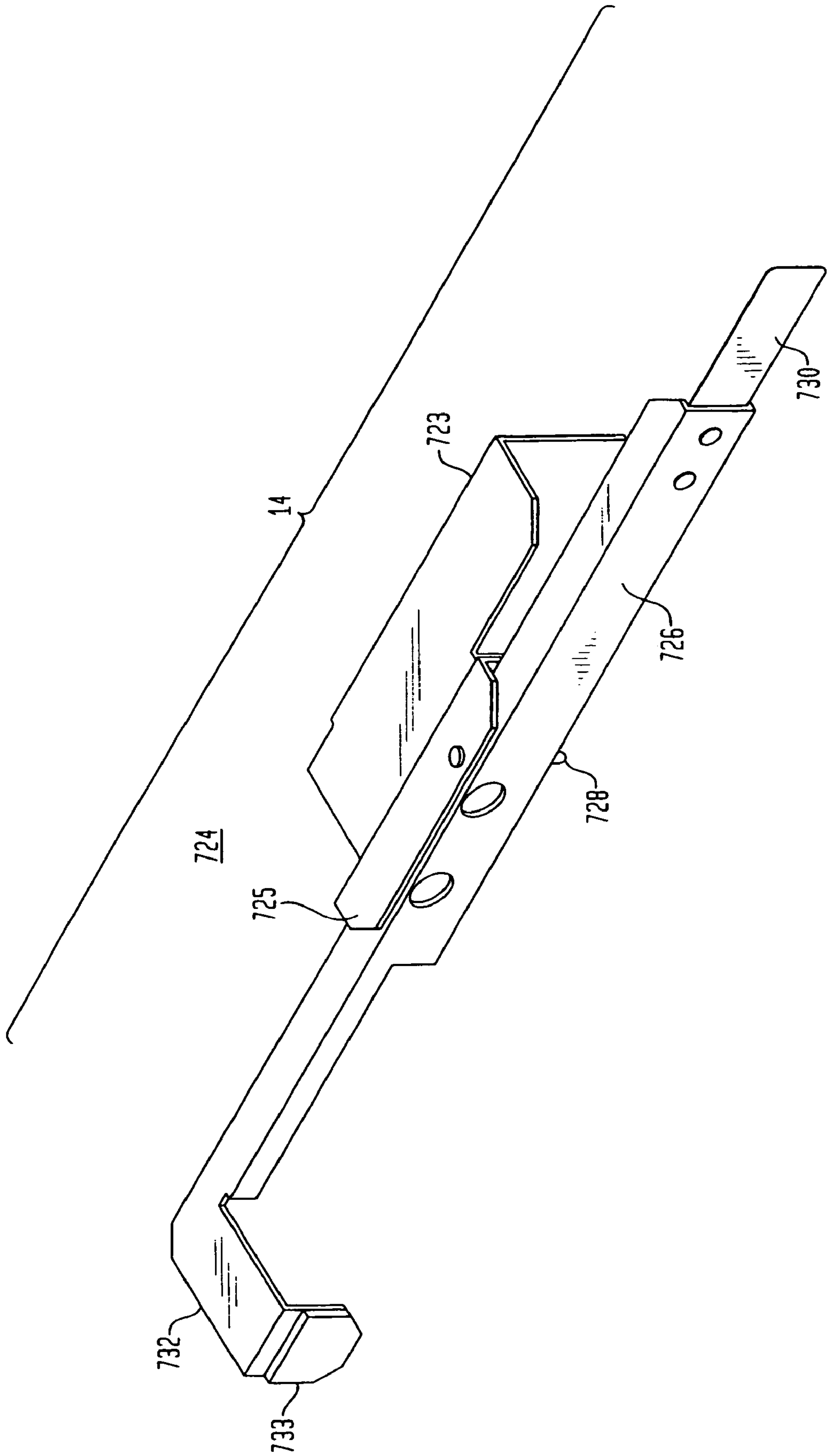

FIGS. 5 and 6 illustrate details of the air junction box 229 which is constructed and operates in accordance with the principles of the present invention, and FIG. 7 illustrates one embodiment of linkage useful for its operation. More specifically, box 229 includes a housing 504 having an air inlet port 506 coupled to hose 220 and an air outlet port 508 coupled via a hose 235 to the blower motor 226. As previously described, blower motor 226 creates a negative air pressure (i.e., suction) which passes through housing 504 via ports 506 and 508 for creating suction at pickup head 224, for allowing picker head 224 to become releaseably engaged to a package requiring handling. In accordance with one aspect of the present invention, and air junction box 229 includes internal thereto an airflow sensor arrangement 600 (shown in detail in FIG. 6), and externally, and a vacuum breaker mechanism 500. Vacuum breaker mechanism 500 includes a pivoting flap mechanism 510 on a topside of housing 504. Flap 510 includes a foam seal 512 attached to an underside of flap 510 and aligned so as to cover a hole 514 in housing 504 (shown more clearly in FIG. 6). Flap 510 includes upward facing side portions through which a pivot pin 515 is provided and around which flap 510 pivots upward when one end of a linkage arm 516 depresses a tab portion 518 of flap 510. When flap 510 pivots upward, hole 614 is exposed to the ambient environment, thereby resulting in a rapid release of vacuum i.e., "suction force", in air hose 220. In the illustrated embodiment, linkage arm 516 rotates about a pivot pin 520 upon contact by a linkage mechanism 624 located in the front door (14 of FIG. 1). Linkage mechanism 724 is shown in FIG. 7.

As illustrated more clearly in FIG. 6, housing 504 includes therein an airflow sensor arrangement 600 for generating a signal which changes in response to the degree of airflow within air hose 220. In the illustrated embodiment, airflow sensor arrangement 600 comprises a two-part switch, a first part of the switch includes a reed switch 602 mounted on a top portion of housing 504, and a second part of the switch includes a magnet 604 mounted at the free end of a swinging arm 606, which "toggles" the operation of switch 602 upon close proximity thereto. Arm 606 swings about a pivot 608 in response to airflow (see arrows 610) from port 506 towards port 508 through housing 504. During strong airflow, arm 606 is maintained in a substantially horizontal position, thereby putting magnet 604 in close proximity to switch 602 and causing reed switch 602 to be in a closed position. Preferably, air deflector panels 612 and 614 are provided in housing 504 in order to ensure that swinging arm 606 is raised to a height sufficient for proper operation of reed switch 602 during varying levels of airflow which may be experienced before article pickup head 224 makes a sufficiently good contact with a package to be dispensed.

Before pickup head 224 contacts a package, the strong airflow through housing 504 will cause arm 606 to swing substantially horizontal, thereby closing reed switch 502. Upon pickup head 224 contacting a package, the surface of the package will block the entrance of air into pickup head 224. This will cause a sudden decrease in airflow within housing 504. This decrease in airflow will cause arm 606 to swing downward and cause reed switch 602 to open, thereby sending a signal to control system 400. This signal indicates that pickup head 224 has made a secure contact to the package, and that it is time to reverse the direction of hose (Z) drive motor 410, as well as activation of the X and Y drive motors 408, for causing removal of the package from the storage area and release of the package in the dispensing area. The signal generated by reed switch 602 can also be used by control system 400 as a check for carriage 218 reaching a precisely known position (e.g., a "virtual home"), in that once carriage 218 reaches the proper positioning for dispensing the package, its leading edge activates linkage 724 of FIG. 7, which is coupled to and operates the quick release air valve. Note, the quick release of vacuum in housing 504 causes reed switch 602 to again provide a signal (since the package is no longer blocking airflow into hose 220), which signal can be used to indicate to control system 400 that the package has been dispensed. Accordingly, the signal can be used to turn off blower motor 226 and initiate return of carriage 218 to its "home" position.

Note, reed switch 602 can be of the normally open or normally closed type and that in other embodiments, deflector panels 612 and 614 may or may not be required. Furthermore, although in the illustrated embodiment a magnetic reed switch is used as the switching element for airflow sensor 600, other types of sensors could be utilized to indicate movement of swinging arm 606, such as a capacitive or inductive sensor/switch arrangement. Additionally, other types of mechanical arrangements can be devised for causing a portion of the airflow sensor to move within housing 504, such as an arm 606 that is made of a material flexible enough to move in response to changes in airflow, just as if it were connected to housing 504 via a pivot.

In accordance with a further aspect of the present invention, since the control system keeps track of the movement of hose 220 and carriage 218 (for example, by sensing pulses from a shaft encoder or other distance measuring device on each of their respective drive motors), the signal generated by reed switch 602 at the time carriage 218 reaches the virtual home can also be used as a check to ensure that control system 400 accurately counted the motor drive pulses, and can re-calibrate the positioning system based on the virtual home, if necessary.

Furthermore, it is noted that the electrical signal from reed switch 502 that occurs indicating that arm 506 had lost contact with magnet 504 could also be provided to the control system 400 as an electrical signal for indicating that carriage 218 has reached a predetermined position within machine 10, i.e., its forward-most position, and his thereby usable to enhance the accuracy of control of the position of carriage 218 via control system 400.

As shown in FIG. 7, mounted along a top portion of the door 14 of vending machine 10 is a door linkage 724. Linkage 724 includes a first U-shaped bracket 723 mounted to door 14, a second U-shaped bracket 725 mounted to bracket 723, and a pivoting arm member 726 which rotates about a pivot 728 held by the opposed sides of bracket 725. Arm 726 includes a flexible member 730 at one end, which is contacted by a leading edge portion of carriage 218 (shown in FIG. 1) when carriage 218 has positioned an article to be dispensed over the article retrieval area or chute 210. The opposite end 732 of arm 726 includes a pad 733 adapted to contact portion 534 of link 516 shown in FIG. 5, which protrudes through a hole (not specifically shown) at the top of support panel 202 (shown in FIG. 2).

It is noted that pivot 728 includes thereon a torsion spring, not shown, which biases arm 726 so that end 732 is normally spaced away portion 534 of link 516. Furthermore, it is noted that flexible member 730 is used to provide for some extended travel or tolerance in the forward positioning of the leading edge of carriage 218 when it is ready to release the selected article into chute 210.

In operation, when the carriage has positioned an article to be dispensed over the package delivery area or chute 210, its leading edge contacts end 730 of arm 726, thereby causing arm 726 to pivot about and cause the other end 732 to urge end 534 of link 516 forward about pivot pin 22, thereby depressing tab portion 518 of flap 510 and causing the foam seal 512 to be raised above, and no longer seal, hole 614 within housing 504. The net effect of the unsealing of hole 614 is that air pressure is rapidly allowed to equalize within housing 504 and thereby cause a rapid loss of suction at pickup head 224, thereby causing the article 223 to be promptly released into the customer retrieval chute 210.

The illustrated embodiment is only an example of a particular embodiment and substantial modifications and alternatives can be conceived therefore. For example, link 516 and seal/flap 512/510 can in a further embodiment, be combined into a single mechanism wherein rotation of link 516 about pivot pin 520 would cause a sealing portion on link 516 to release its seal over a hole in housing 504. For example, link 516 can be positioned so as to have its leading edge slide along a side of housing 504 instead of being positioned to rotate towards its top. In the alternative embodiment wherein link 516 slides along a side of housing 504, the side of link 516 can engage and seal over a hole in the side of housing 504, so that its rotation upon urging by door linkage 724 can directly cause the hole in the side of housing 504 to become unsealed.

Further alternative embodiments should also be considered, such as different kinds of linkage mechanisms 724. One such embodiment could comprise a horizontal rod having orthogonal endportions so as to form a "crank". Contact by the carriage at one end of the rod causes the rod to rotate, instead of pivot in the case of linkage 724. The other end portion of the rod pivots in a corresponding manner, thereby depressing tab portion 518 of flap 510, and causing the quick release of the article. A further embodiment could have a direct, solenoid activated flap 510 which would be activated when the appropriate forward position of carriage 218 has been reached, as determined by a sensor. Specific advantages may be realized to a lesser or extent in these alternatives. For example, door linkage 724 can be mounted along a top front portion of the vending machine cabinet 12, instead of door 14. This may not be a preferred location, however, because it may interfere with the operator re-loading of product inside of the vending machine cabinet. These and other modifications are considered to be within the scope of the present invention.

Even furthermore, in the event that the quick release of the product is not required until the pickup head has moved the product to the bottom of the product delivery chute 210, means for activating the quick release which is different than the forenoted linkage shown in FIG. 7 or a proximity switch which senses that carriage 218 has become aligned with chute 210, would be required. In this embodiment, the quick release valve could the activated in response to an additional movement by carriage 218. For example, instead of linkage 724 being activated by forward motion of carriage 218, a modification of linkage 724 could be provided which would require for activation a horizontal (left/right) movement of the carriage. Such horizontal movement by the carriage could take place immediately after the pickup head has reached the bottom of chute 210.

As noted above, the present invention as described above provide electrical signals to the control mechanism representative of changes in suction at the free end of said hose, so as to provide all of the advantageous sought therefore, such as:

1. Activating a mechanism which will release the article in a manner which is faster than the gradual release of suction in the pickup head;
2. Activating the release valve without the requirement for an independent electrical circuit;
3. Providing a low-cost and highly reliable and tolerant technique for determining whether or not the product has been/still is gripped;
4. Providing feedback to the system controller that the suction mechanism is working properly;
5. Providing a low-cost and reliable sensor which is relatively immune to typical voltage fluctuations and airflow changes that occurred during normal operation of the device Many of the benefits of the invention described herein could also be particularly useful in an article dispensing apparatus of the type having a refrigerated compartment, such as a chest freezer including various doors thereon (such as described for the ice cream dispenser in U.S. Pat. No. 5,240,139), in combination with the forenoted methods and apparatus for creating, sensing and/or maintaining suction at the gripping end of the suction hose.

While this invention has been particularly shown and described with references to preferred embodiments thereof, it will be understood by those skilled in the art that various changes in form and details may be made therein without departing from the spirit and scope of the invention as defined by the appended claims. In fact, many such changes are already noted in this description. Those skilled in the art will recognize, or be able to ascertain using no more than routine experimentation, many equivalents to the specific embodiments of the invention described specifically herein. For example, although a flap is described for being responsive to changes in airflow, other mechanisms could be used, such as some other type of "floating" device, such as a ping-pong ball, are possible; or even a device which actually measures the airflow, such as an air driven turbine. Such equivalents are intended to be encompassed in the scope of the appended claims.

The invention claimed is:

1. An article dispensing apparatus, comprising:

an enclosure defining therein an internal storage cavity and having an access path that leads from said internal cavity toward an article delivery port;

an article holder within said internal cavity for holding a plurality of selectable articles;

an article grasping and extracting mechanism for removing at least one of said plurality of selectable articles from said article holder in response to one or more dispense control signals;

a positioning mechanism operatively connected with said article grasping and extracting mechanism for moving said article grasping and extracting mechanism within said enclosure in response to said one or more dispense control signals; and a controller operatively connected with said article grasping and extracting mechanism and with said positioning mechanism for producing and providing said one or more dispense control signals thereto to cause said article grasping and extracting mechanism and said positioning mechanism to cooperatively remove a selected article from said article holder and transport said selected article toward said access path wherein, said article grasping and extracting mechanism includes a suction hose having one end coupled to a source of suction, and a free end adapted to grasp an article by use of suction force created by said source of suction;

a vacuum release mechanism is coupled to said suction hose for providing an opening to said suction hose when said vacuum release mechanism is activated, said opening causing a quick release of said suction force from said suction hose, and consequently quick release of the grasped article, when said vacuum release mechanism is activated; and said vacuum release mechanism is activated by mechanical contact caused by a portion of one of said article grasping and extracting mechanism or said positioning mechanism, said mechanical contact occurring when said article grasping and extracting mechanism has reached a point in its movement where the selected article has been transported to said access path.

2. The article dispensing apparatus of claim 1, wherein said source of suction comprises blower motor, which provides a relatively high volume of airflow but a relatively modest negative air pressure, as compared with a vacuum pump, which provides relatively lower volume of airflow but a relatively higher negative air pressure.

3. The article dispensing apparatus of claim 1, further including a mechanical linkage mechanism having one end adapted to mechanically contact said portion of one of said article grasping and extracting mechanism or said positioning mechanism, when said article is transported to said access path, and said mechanical linkage mechanism having an other end adapted to activate said vacuum release device when said article is transported to said access path.

4. An article dispensing apparatus, comprising:

an article storage area;

an article grasping mechanism;

a positioning mechanism coupled to the article grasping mechanism for controllably positioning the article grasping mechanism so as to be aligned with a given article stored in the storage area, and for controllably contacting and extracting said article from the storage area, and then controllably positioning the article grasping mechanism so as to transport said article toward a place associated with a dispensing area;

a control mechanism for controlling operation of said article grasping mechanism and said positioning mechanism, and a quick release device mechanically coupled to the article grasping mechanism, and responsive to mechanical contact by said positioning mechanism to operate, said operation facilitating a quick release of the article being handled by said article grasping mechanism to the place associated with the dispensing area.

5. The article dispensing apparatus of claim 4, further including a mechanical linkage mechanism having one end adapted to mechanically contact said positioning mechanism when said article is transported to said place associated with the dispensing area, and said mechanical linkage mechanism having an other end adapted to operate said quick release device.

6. The article dispensing apparatus of claim 4, wherein said quick release device comprises a relatively airtight housing, said housing having a pneumatic coupling between first and second input ports, said first input port being coupled to said article grasping mechanism, and said second input port being coupled to a source of suction.

7. The article dispensing apparatus of claim 6, wherein said source of suction comprises a blower motor, which provides a relatively high volume of airflow but a relatively modest negative air pressure, as compared with a vacuum pump which provides a relatively lower volume of airflow but a relatively higher negative air pressure.

8. The article dispensing apparatus of claim 6, wherein said housing includes an airflow control mechanism for allowing a rapid influx of air into said housing, thereby facilitating a quick release of the article being handled.

9. The article dispensing apparatus of claim 8, wherein said airflow control mechanism comprises:

an opening in said housing, and a releasable air-sealing mechanism for substantially sealing said opening in said housing so air does not pass therethrough, and being selectively operable for releasing said seal so as to allow air to pass therethrough.

10. The article dispensing apparatus of claim 9, further including a mechanical linkage mechanism having one end adapted to mechanically contact said positioning mechanism when said article is transported to said place associated with the dispensing area, and said mechanical linkage mechanism having an other end adapted to operate said releasable air-sealing mechanism when said article has been transported to said place.

11. An article dispensing apparatus, comprising:

an article storage area;

an article grasping mechanism;

a positioning mechanism coupled to the article grasping mechanism for controllably positioning the article grasping mechanism so as to be aligned with a given article stored in the storage area, and for controllably contacting and extracting said article from the storage area, and ten controllably positioning the article grasping mechanism so as to transport said article toward a place associated with a dispensing area;

a control mechanism for controlling operation of said article grasping mechanism and said positioning mechanism, and a quick release device coupled to the article grasping mechanism for facilitating a quick release of the article being handled by said article grasping mechanism to the place associated with the dispensing area, wherein:

said quick release device includes a releasable air-sealing mechanism for substantially sealing an opening so air does not pass therethrough, and being selectively operable for releasing said air-sealing mechanism so as to allow air to pass therethrough, said air-sealing mechanism being pneumatically coupled between said article grasping mechanism and a source of suction;

wherein said source of suction comprises a blower motor, which provides a relatively high volume of airflow but a relatively modest negative air pressure, as compared with a vacuum pump which provides a relatively lower volume of airflow but a relatively higher negative air pressure.

12. The article dispensing apparatus of claim 11, wherein said quick release device comprises a relatively airtight housing, said housing having a pneumatic coupling between first and second input ports, said first input port being coupled to said article grasping mechanism, and said second input port being coupled to said source of suction.

13. The article dispensing apparatus of claim 11, further including a mechanical linkage mechanism having one end adapted to mechanically contact said positioning mechanism when said article is transported to said place associated with the dispensing area, and said mechanical linkage mechanism having an other end adapted to operate said releasable air-sealing mechanism when said article has been transported to said place.

14. An article dispensing apparatus, comprising:

an enclosure defining therein an internal storage cavity and having an access path that leads toward an article delivery port;

an article holder within said internal cavity for holding a plurality of selectable articles to be dispensed;

an article gasping and moving mechanism for controllably grasping a selected article in the article storage area and moving the article from the storage area to the access path;

a source of suction coupled to the article grasping and moving mechanism, for providing negative air pressure thereto which is used for grasping the selected article;

a control mechanism for controlling operation of the article grasping and moving mechanism, and a quick release device coupled to the article grasping and moving mechanism for facilitating a prompt release of the article being handled by the article grasping and moving mechanism, said release occurring at a point along the access path, wherein:

said source of suction is coupled to a blower motor for generating said negative air pressure, said blower motor building up and providing to the source of suction a negative air pressure which is sufficient to grasp said selected article after the blower motor has been activated, and sustaining the providing of said sufficient negative air pressure to the source of suction a given period of time after the blower motor has been de-activated; and said quick release device is operated so as to quickly change the negative air pressure that is coupled to the article grasping and moving mechanism to an amount which is no longer sufficient to grasp the selected article when the article grasping and moving mechanism has moved the selected article to said point along the access path, said change in negative air pressure occurring within a time period which is less than said given time period, thereby causing the grasped article to be released before the end of the given time period.

15. The article dispensing apparatus of claim 14, wherein said quick release device is pneumatically coupled to the article grasping and moving mechanism, and includes an airflow control mechanism for allowing a rapid influx of ambient air pressure into said enclosure and consequently also into said pneumatic coupling.

16. The article dispensing apparatus of claim 14, wherein said quick release device includes:

a relatively air-tight housing pneumatically coupled between said article grasping and moving mechanism and said source of suction; and a releasable air-sealing mechanism, said mechanism substantially sealing an opening in said housing so ambient air does not pass therethrough, and being selectively operable for unsealing said opening so as to allow air to pass therethrough.

17. The article dispensing apparatus of claim 14, wherein said blower motor provides a relatively high volume of airflow but a relatively modest negative air pressure, as compared with a vacuum pump which provides a relatively lower volume of airflow but a relatively higher negative air pressure.

18. The article dispensing apparatus of claim 14, further including a mechanical linkage mechanism having one end adapted to mechanically contact said article grasping and moving mechanism when the grasped article reaches said point along access path, and said mechanical linkage mechanism having an other end adapted to operate said quick release device in response to said one end being mechanically contacted by the article grasping and moving mechanism.

19. The article dispensing apparatus of claim 16, further including a mechanical linkage mechanism having one end adapted to mechanically contact said article grasping and moving mechanism when the grasped article reaches said point along access path, and said mechanical linkage mechanism having an other end adapted to operate said releasable air-sealing mechanism in response to said one end being mechanically contacted by the article grasping and moving mechanism.

20. The article dispensing apparatus of claim 16, wherein said housing includes an input port, an output port, and a pneumatic coupling therebetween, said input port being pneumatically coupled to said source of suction, and said output port being pneumatically coupled to said article grasping mechanism.

21. An article dispensing apparatus, comprising:

an article storage area for storing along a depth dimension thereof, a plurality of articles, said articles being stored adjacent one another in the storage area so that at least some of the articles are positioned a various different depths into the storage area;

a suction sustaining hose having a first end adapted to contact and extract a selected article from the storage area and a second end coupled to a source of suction;

a hose positioning mechanism coupled to the hose for controllably positioning the first end of the hose so that the first end of the hose is aligned with a given article stored in the storage area, and for controllably contacting and extracting said article from the storage area, and thereafter controllably positioning the first end of the hose so as to facilitate transportation of said article toward a dispensing area;

a control mechanism for controlling operation of said source of suction and said hose positioning mechanism, and a sensor in pneumatic coupling with said hose for providing electrical signals to said control mechanism representative of a pneumatic change at the free end of said hose, said control system turning the source of suction on before the free end of the hose comes into contact with an article to be extracted, and said sensor detecting a pneumatic change which occurs when the free end of the hose engages said article, said detected pneumatic change being used by said control apparatus for determining the depth at which said top article is positioned within said storage area.

22. The article dispensing apparatus of claim 21, wherein said detected pneumatic change is used by said control apparatus for maintaining updated information about the depth of the top articles stored in said storage area.

23. The article dispensing apparatus of claim 22, wherein said updated information about the depth of the top articles stored in said storage area is used by said control apparatus for controlling operation of said hose positioning mechanism.

24. An article dispensing apparatus, comprising:

an article storage area;

a suction sustaining hose having a first end adapted to contact and extract a selected article from the storage area and a second end coupled to a source of suction;

a hose positioning mechanism coupled to the hose for controllably positioning the first end of the hose so as to be aligned with a given article stored in the storage area, and for controllably contacting and extracting said article from the storage area, and thereafter controllably positioning the first end of the hose so as to facilitate transportation of said article toward a dispensing area;

a control mechanism for controlling operation of said source of suction and said hose positioning mechanism, and a sensor in pneumatic coupling with said hose for providing electrical signals to said control mechanism representative of changes in suction at the free end of said hose, said control system turning the source of suction on before the free end of the hose comes into contact with an article to be extracted, and said sensor detecting a pneumatic change which occurs when the free end of the hose engages said article, said detected pneumatic change being used by said control apparatus as a determination of the timing of the free end of the hose making secure contact to said article.

25. The article dispensing apparatus of claim 24, wherein said sensor comprises an airflow sensor.

* * * * *